United States Patent [19]
Tooth

[11] Patent Number: 4,805,260
[45] Date of Patent: Feb. 21, 1989

[54] EXPANDER DEVICE

[75] Inventor: Arthur C. Tooth, Maidenhead, England

[73] Assignee: Flexello Castors & Wheels PLC, United Kingdom

[21] Appl. No.: 914,362

[22] Filed: Oct. 2, 1986

[30] Foreign Application Priority Data

Oct. 3, 1985 [GB] United Kingdom ............... 8524419

[51] Int. Cl.⁴ ............................................. B60B 35/00
[52] U.S. Cl. ........................................ 16/37; 16/30;
16/43; 411/51; 411/58; 411/908
[58] Field of Search ..................... 16/2, 37, 38, 43;
411/44, 50, 51, 55, 57, 58, 59, 60, 381, 49, 54,
41, 908

[56] References Cited
U.S. PATENT DOCUMENTS

| | | | |
|---|---|---|---|
| 2,100,873 | 11/1937 | Roberts | 411/58 |
| 2,173,950 | 9/1939 | Parkhill | 16/38 |
| 2,955,504 | 10/1960 | Lovrinch et al. | 411/51 |
| 3,986,626 | 10/1976 | Montgomery | 215/321 |
| 4,180,175 | 12/1979 | Virog, Jr. et al. | 215/252 |

FOREIGN PATENT DOCUMENTS 1169799 11/1969 United Kingdom .

Primary Examiner—Nicholas P. Godici
Assistant Examiner—Edward A. Brown
Attorney, Agent, or Firm—Stevens, Davis, Miller & Mosher

[57] ABSTRACT

An expander device for anchoring in a hole to secure a castor to a part which forms the hole, comprises a conical expander engaged in a sleeve having a conical interior. The expander and the sleeve are mouldings of reinforced plastics material. The expander is screwed onto a coaxial bolt with a 3-start thread. The sleeve is axially slotted from either end, the slots from one end being angularly spaced from one another by 90° as are the other slots with which they are assymetrical so that alternate major and minor sleeve portions are formed between adjacent slots. Deformation takes place predominantly in the minor portions as the sleeve is expanded by axial movement of the conical expander into the internal taper of the sleeve which is caused by rotation of the bolt.

11 Claims, 2 Drawing Sheets

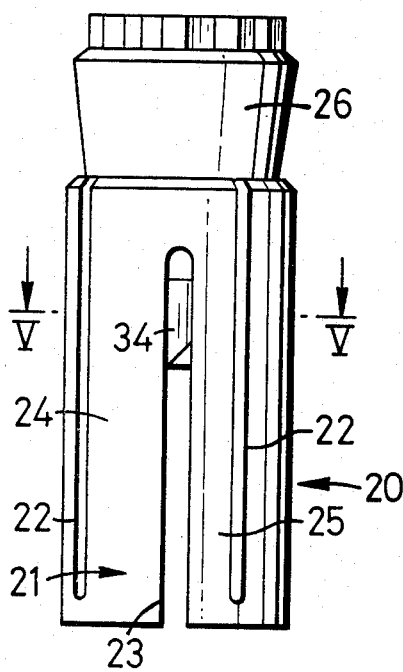
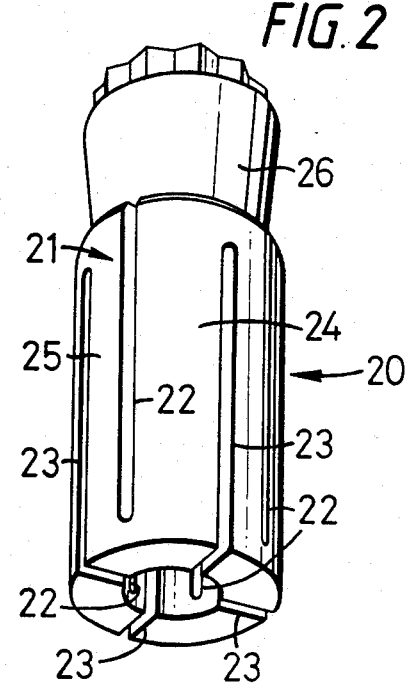
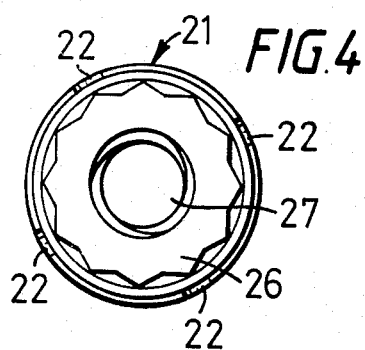
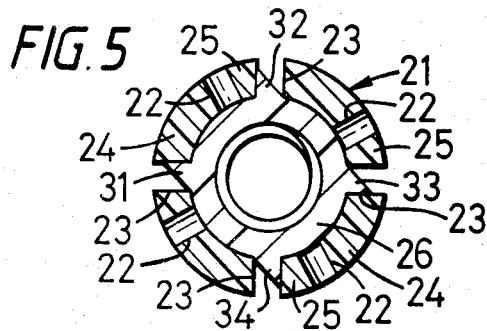
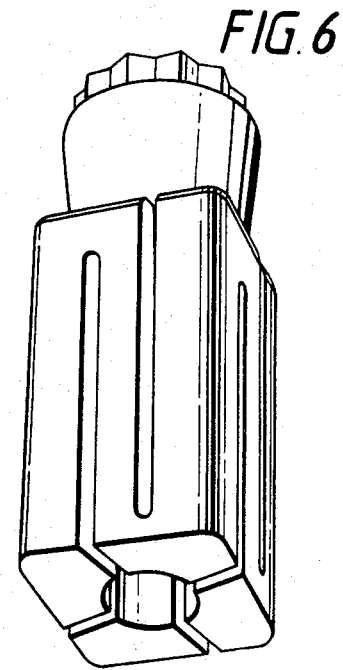

EXPANDER DEVICE

This invention relates to expander devices for anchoring in a hole by expansion therein. It relates particularly not exclusively, to the securing of castors to the legs of furniture and the like.

Traditional castors and similar objects have been secured into the bores of tubular legs by either solid steel spigots or by metal expanding adaptors such as are shown in FR-A-No. 1596797 and in EP-A-No. 145795. Both of the above are expensive and will only fit specific bore sizes. Several attempts have been made to produce plastic expanders but they have proved unreliable due to 'compression set' (creep under high stress) of the plastic parts allowing the fitting to loosen and the castor to fall out. Furthermore, previous plastic expander devices have all used two pairs of conical parts, either in opposition as is used in EP-A-No. 145795 or facing in the same direction, acting at opposite ends of an expansible sleeve. This gives a small effective working area of the cones with steep cone angles resulting in failure due to 'compression set'. According to this invention there is provided an expander device for anchoring a castor in a hole by expansion therein; the device comprising a radially expansible sleeve having a conical inner surface which extends over at least a major portion of the axial extent of the sleeve; an expander member engageable in the sleeve and having an outer surface at least a major portion of which is conical; the conical surface portions of the sleeve and the expander member being adapted for sliding interengagement over a major portion of the axial extent of the sleeve such that axial movement of one of the expander member and the sleeve relative to the other causes radial expansion of the sleeve; an elongate, externally-threaded member engaged in a complementary, axially-extending tapped bore in the expander member; and means for rotating the externally-threaded member relative to the expander member whereby to move the expander member relative to the sleeve and thereby to expand the sleeve into contact with the hole and anchor it therein; wherein the sleeve and the expander member are formed of a plastics material whereby the material of the latter is caused to compression set onto the externally-threaded member when the sleeve is expanded into contact with the hole so that the expander member functions as a stiff nut.

Preferably the externally-threaded member has a multi-start (eg. a three start) thread.

The conical inner surface portion of the sleeve is preferably formed over at least half, and more preferably at least three quarters, of the axial extent of the sleeve.

The outer radial extent of the expander member may be less than the outer radial extent of the sleeve. In this way, the sleeve with the expander member in a preliminarily assembled state may be inserted in the hole, even if the hole is of only a slightly greater size than the sleeve in its unexpanded state.

Conveniently, the moving means acts between the expander member and one end of the sleeve. For this purpose, the moving means may comprise abutment means for acting against said one end of the sleeve.

Typically, the expandibility of the sleeve will be achieved by at least two first slots in the sleeve extending from one end thereof part way towards the opposite end, and at least two second slots extending from the opposite end part way towards the one end. A preferred arrangement of the slots is asymmetrical so as to define major and minor sleeve portions therebetween, so that during expansion of the sleeve deformation thereof takes place predominantly in the minor portion or portions.

The expander member may be provided with a radial protrusion for each second slot, the protrusions being spaced apart angularly to the same extent as are the second slots, each protrusion being adapted to be engaged within a respective one of the second slots within which it is a snap fit and is slidable longitudinally. Each protrusion conveniently has a radial face and another face which is oblique to the radial face, the protrusions being arranged in pairs, the radial faces of the protrusions of each pair being the adjacent faces of that pair and being in face to face engagement with the respective side wall of the respective slot within which the respective protrusion is engaged whereby to positively oppose relative rotation between the sleeve and the expander member in either angular sense. The protrusions serve to interlock the sleeve and the expander member so that, as well as being kept together, they are placed in the correct axial relationship for entry into a bore of minimum size.

The invention also encompasses a castor having an expander device as above.

Two embodiments of the invention will now be described, by way of example, with reference to the accompanying drawings, wherein:

FIG. 2 is a perspective view of the expander device of the part of the castor shown in FIG. 1;

FIG. 3 is a side elevation of the expander device shown in FIG. 2;

FIG. 4 is an end elevation of the expander device as seen along arrow A in FIG. 3;

FIG. 5 is a section on the line V—V of FIG. 3; and

FIG. 6 is a perspective view, similar to FIG. 2, of another form of expander device in which the invention is embodied.

Figure 1:
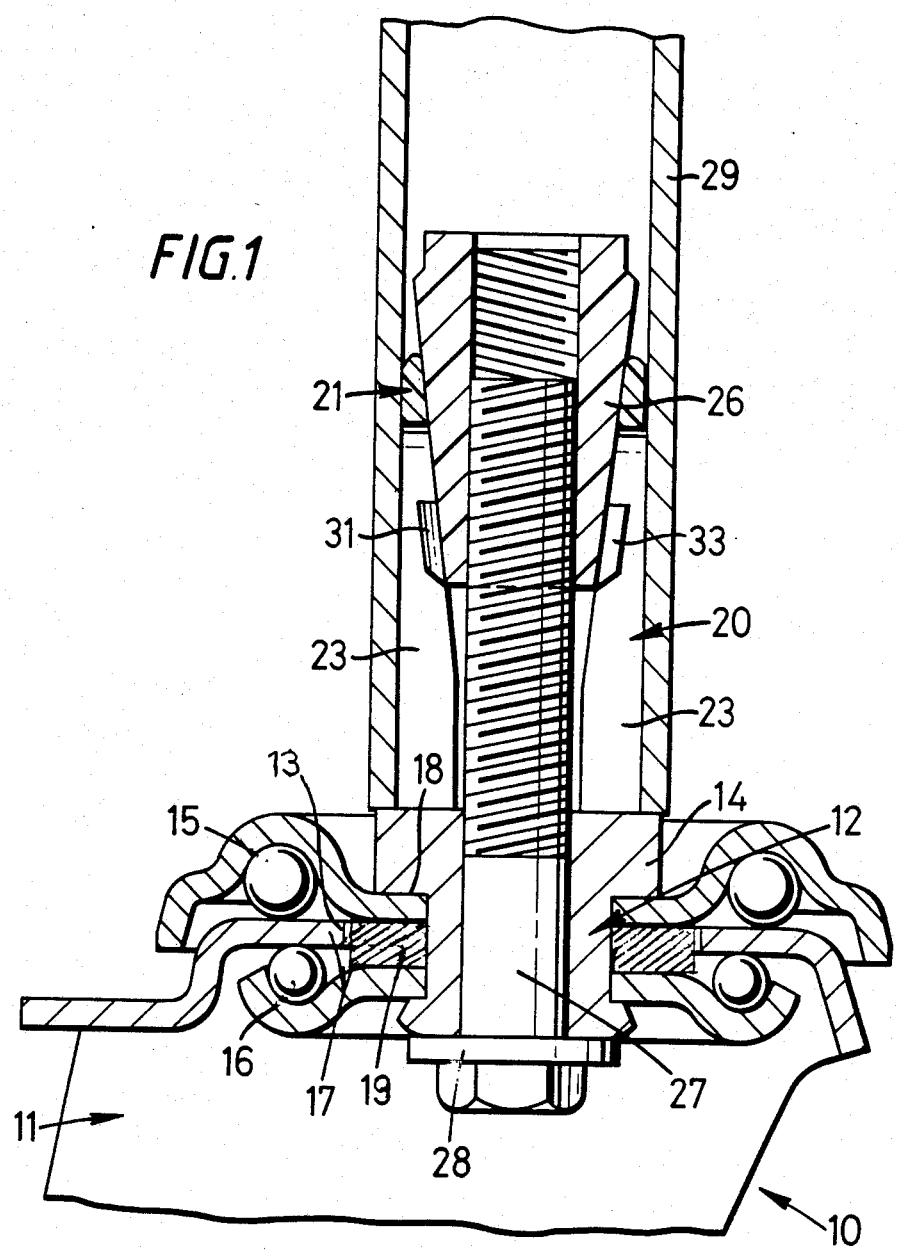
FIG. 1 is a transverse section of part of a castor having an expander device embodying the invention attached thereto for securing the castor to a leg of a piece of furniture, the plane of the section passing through an opposed pair of second slots of the sleeve of the expander device, the protrusions engaged in those slots being shown in elevation.

FIG. 1 shows part of a castor 10. The castor comprises a fork frame 11 in which at least one castor wheel (not shown) is journalled. A hub assembly 12, which includes a double rolling bearing, is provided to allow the usual swivelling of the castor 10 relative to a leg to which it is to be secured. The fork frame 11 is formed with an aperture 13 which receives the hub 14 of the hub assembly 12, the two ball races 15 and 16 being separated by an annular portion 17 of the fork frame 11 in which the aperture 13 is formed, the ball bearings of the two ball races 15 and 16 running on either the upper or lower face of the annular portion 17. An annular spacer 19 surrounds the hub 14 within the aperture 13 and separates the central portions of the two ball races 15 and 16 which abut it on either its top or its bottom face. It will be appreciated that the longitudinal axis of the castor 10, is upright in use as is shown in FIG. 1.

The hub 14 is formed by a tubular rivet having a shoulder 18 which locates against the upper ball race 15. During assembly, the rivet is passed into a central hole of the upper ball race 15, through the aperture 13 and through central holes in the annular spacer 19 and the lower ball race 16. The lower end of the rivet is then hammered so as to deform outwardly and complete formation of the hub 14, thereby retaining the lower ball race 16 as shown in FIG. 1.

FIGS. 2 and 3 show that the expander device 20 comprises a radially expansible cylindrical sleeve 21 of a reinforced plastics material such as a glass-filled nylon or a glass-filled polyacetyl material, or other synthetic material. The expansibility is achieved by means of longitudinal slots formed in the sleeve 21 together with the inherent flexibility of the plastics material. Four of the slots, which are referred to from thereon as the first slots 22 and which are spaced circumferentially at 90 degrees with respect to one another, as can be seen from FIG. 2, extend from the upper end of the sleeve 21 towards the lower end over a majority of the length of the sleeve 21. Four more of the slots, which are referred to from hereon as the second slots 23 and which are spaced circumferentially at 90 degrees with respect to one another as well, extend from the lower end of the sleeve 21 towards the upper end, again over a majority of the axial extent of the sleeve 21. The first and second slots 22 and 23 are arranged asymmetrically with respect to each other so as to define major and minor arcuate sleeve portions 24 and 25 therebetween, the major arcuate sleeve portions 24 each subtending an angle at the axis of the sleeve 21 in the unexpanded state of the sleeve 21 which is about twice that subtended at that axis by each of the minor arcuate sleeve portions 25. Hence when the sleeve 21 expands, deformation takes place predominantly in the minor portions 25 which take up a slight S configuration allowing the major portions 24 to move radially outwardly into contact with the wall 29 (see FIG. 1) of the hole in the leg within which the device 20 is to be anchored to secure the castor 10 to the leg. This ensures that the axis of the major portions 24 remain substantially parallel to the longitudinal axis of the device 20 as the device 20 expands, and thereby enables the device 20 to be used with a wide range of hole sizes.

FIG. 1 shows that the inner surface of the sleeve 21 is conical over about three quarters of the length of the sleeve 21. The angle of taper is relatively small (viz. about 8° to the longitudinal axis) although it could be somewhat greater, say up to about 15°, or slightly smaller, say a little less than 5°.

An expander member 26, also of a reinforced plastics material, is formed with a correspondingly conical outer surface for sliding engagement with the conical inner surface portion of the sleeve 21. The expander member 26 has a threaded central bore to receive a bolt 27 which passes through the bore of the hub 14. The bolt 27 is a washer faced bolt having a "washer" portion 28 for engagement with the lower end of the hub 14. The washer faced bolt 27 is used because of its reduced head size which will restrict the torque applied during assembly. FIG. 4 shows, that the bolt 2 has a three-start thread, i.e., it is a triple threaded bolt. Hence it has a lead, or advance per revolution, which is three times that of a single start thread having the same pitch. As well as enabling quicker tightening, use of the three-start thread minimises the risk of over-tightening of the bolt. That is because the mechanical advantage is lower than it would be if a single start thread having the same pitch was used since the angle included between the thread and the axis of the bolt is less for the three-start thread than for a single start thread. Furthermore, interaction of the sleeve 21 and expander member 26 during tightening forces the expander member 26 to pinch the thread on the bolt 27 and absorb some of the torque, thereby also helping to prevent over-tightening. That is because both the sleeve 21 and the expander member 26 are subjected to radial compression over a substantial area of contact which extends axially to a considerable extent so that the plastics material of the expander member 26 is always compressed onto the threads and thus compression sets onto the threads of the bolt 27. The contraction of the expander member 26 onto the bolt 27 will also lead to the expander member 26 acting as a "stiff nut" and thereby eliminate the risk of loosening of the bolt 27 when the castor 10 is subjected to heavy impacts or severe vibration.

The use of reinforced plastics material for the sleeve 21 and the expander member 26 avoids undesirable deformation and reduces the tendency for each plastics material to compression set.

It will be appreciated that appropriate rotation of the bolt 27 will cause the expander member 26 to descend, as seen in FIG. 1, the conical surfaces sliding against each other and causing expansion of the sleeve 21 against the wall 29 of the hole. The upper end of the hub 14 abuts against the lower end of the sleeve 21 and thus the force is applied between the expander member 26 and that end of the sleeve 21.

In order to prevent relative rotation of the sleeve 21 and expander member 26, the latter is provided with four radial protrusions 31-34, (see FIGS. 1, 3 and 5). FIG. 5 shows that each protrusion 31-34 is engaged in a respective one of the second slots 23. The four protrusions 31-34 which are each a snap fit in the respective second slot 23 and which are slidable along that second slot 23, are each tapered radially outwardly, having one radial face and another face which is oblique to the radial face without being tangential to the conical outer surface of the expander member 26. The protrusions 31-34 are arranged in two opposed pairs 31 and 32, and 33 and 34. The radial faces of the protrusions 31 and 32, 33 and 34 of each pair are the adjacent faces of that pair and they are in face to face engagement with the respective side wall of the respective second slot 23 so as to positively prevent relative rotation between the sleeve 21 and the expander member 26 in either direction. The interlocking of the sleeve 21 and the expander member 26 by engagement of the protrusions 31-34 in the second slots 23, as well as keeping them together, places them in the correct axial relationship for entry into a bore of minimum size. Although use of a one piece expander member 26, as shown in the drawings, is preferred for various reasons, the expander member could be made in two similar halves, divided along a diametral plane and connected together by integral hinges at one end, which would allow the use of simpler mould tooling.

All items in the castor 10, other than the sleeve 21 and expander member 26 are of metallic materials.

The expansible sleeve need not have a cylindrical exterior as shown in FIGS. 1 to 5. The external surface of the expansible sleeve may have any form that is appropriate having regard to the shape of the hole into which it is to be anchored. For example it may be square as shown in FIG. 6.

The expander devices shown in the drawings eliminate the problems described above because the matched concial parts have a relatively long taper and there is always a very large area of engagement as compared to all earlier products. The resultant low radial contact pressure in conjunction with the small included angles, virtually eliminates 'compression set' between the matched conical parts and produces a self locking effect which will hold the two components together even if the bolt is partially loosened. In fact, the expander device 20 can only be removed after the bolt has been hammered upwards to unlock and separate the two conical surfaces.

Arranging the outer radial extent of the expander member to be less than that of the sleeve enables insertion of the sleeve and the expander member in a preliminary assembled state into a hole which is only slightly greater in size than the sleeve in its unexpanded state.

I claim:

1. An expander device for anchoring a castor in a hole by expansion therein, said device comprising:
   a radially expansible sleeve formed of a plastics material and having a conical inner surface which extends over at least a major portion of the axial extent of the sleeve;
   an expander member formed of a plastic material, engageable in the sleeve and having an outer surface at least a major portion of which is conical; the conical surface portions of the sleeve and the expander member being adapted for sliding interengagement over a major portion of the axial extent of the sleeve such that axial movement of one of the expander member and the sleeve relative to the other causes radial expansion of the sleeve;
   an elongated externally-threaded member having a multi-start thread engaged in a complementary, axially extending tapped bore in the expander member, the multi-start thread acting to limit the applied torque to avoid overtightening; and
   means for rotating the externally-threaded member relative to the expander member so as to move the expander member relative to the sleeve and thereby to expand the sleeve into contact with a surface defining said hole and to anchor it therein.

2. An expander device according to claim 1, wherein the sleeve is formed with at least two first slots extending from one end of the sleeve part way towards the opposite end, and at least two second slots extending from the opposite end part way towards the one end.

3. An expander device according to claim 2, wherein the first and second slots are arranged assymetrically so as to define major and minor sleeve portions therebetween, so that during expansion of the sleeve deformation thereof takes place predominantly in the minor portions.

4. An expander device according to claim 1, wherein the conical portion of the sleeve is formed over at least half, and preferably over at least three quarters of the axial extent thereof.

5. An expander device according to claim 1, wherein the outer radial extent of the expander member is not greater than the outer radial extent of the sleeve.

6. An expander device according to claim 1, wherein the moving means acts between the expander member and one end of the sleeve.

7. An expander device according to claim 2, wherein the expander member is provided with a radial protrusion for each second slot, the protrusions being spaced apart angularly to the same extent as are the second slots, each protrusion being adapted to be engaged within a respective one of the second slots within which it is a snap fit and is slidable longitudinally.

8. An expander device according to claim 7, wherein each protrusion has a radial face and another face which is oblique to the radial face, the protrusions being arranged in pairs, the radial faces of the protrusions of each pair being the adjacent faces of that pair and being in face to face engagement with the respective side wall of the respective slot within which the respective protrusion is engaged whereby to positively oppose relative rotation between the sleeve and the expander member in either angular sense.

9. An expander device for anchoring a castor in a hole by expansion therein, said device comprising:
   a radially expansible sleeve formed of a plastics material and having a conical inner surface which extends over at least a major portion of the axial extent of the sleeve;
   an expander member formed of a plastics material, engageable in the sleeve and having an outer surface at least a major portion of which is conical; the conical surface portions of the sleeve and the expander member being adapted for sliding interengagement over a major portion of the axial extent of the sleeve such that axial movement of one of the expander member and the sleeve relative to the other causes radial expansion of the sleeve;
   an elongate externally-threaded member engaged in a complementary, axially extending tapped bore in the expander member; and
   means for rotating the externally-threaded member relative to the expander member so as to move the expander member relative to the sleeve and thereby to expand the sleeve into contact with a surface defining said hole and to anchor it therein;
   wherein the sleeve is formed with at least two first slots extending from one end of the sleeve part way toward the opposite end of said sleeve, and at least two second slots extending from said opposite end part way toward said one end, the first and second slots being arranged assymetrically so as to define major and minor sleeve portions therebetween, so that during expansion of the sleeve, deformation thereof takes place predominantly in the minor sleeve portions.

10. An expander device for anchoring a castor in a hole by expansion therein, said device comprising:
   a radially expansible sleeve formed of a plastics material and having a conical inner surface which extends over at least a major portion of the axial extent of the sleeve;
   an expander member formed of a plastics material, engageable in the sleeve and having an outer surface at least a major portion of which is conical; the conical surface portions of the sleeve and the expander member being adapted for sliding engagement over a major portion of the axial extent of the sleeve such that axial movement of one of the expander member and the sleeve relative to the other causes radial expansion of the sleeve;
   an elongate externally-threaded member engaged in a complementary, axially extending tapped bore in the expander member; and
   means for rotating the externally-threaded member relative to the expander member so as to move the expander member relative to the sleeve and thereby to expand the sleeve into contact with a surface defining said hole and to anchor it therein;
   wherein the sleeve is formed with at least two first slots extending from one end of the sleeve part way toward the opposite end of said sleeve, and at least two second slots extending from said opposite end part way toward said one end, the expander member being provided with a radial protrusion for each second slot, the protrusions being spaced apart angularly to the same extent as are the second slots, each protrusion being adapted to be engaged within a respective one of the second slots within which it is snap fitted and is slidable longitudinally therein, each protrusion having a radial face and another face which is oblique to the radial face, the protrusions being arranged in pairs, the radial faces of the protrusions of each pair being the adjacent faces of that pair and being in face-to-face engagement with the respective sidewall of the respective slot within which the respective protrusion is engaged so as to positively oppose relative rotation between the sleeve and the expander member in either angular sense.

11. A castor including an expander device for anchoring it in a hole by expansion therein, said device comprising:

a radially expansible sleeve formed of a plastics material and having a conical inner surface which extends over at least a major portion of the axial extent of the sleeve;

an expander member formed of a plastics material, engageable in the sleeve and having an outer surface at least a major portion of which is conical; the conical surface portions of the sleeve and the expander member being adapted for sliding interengagement over a major portion of the axial extent of the sleeve such that axial movement of one of the expander member and the sleeve relative to the other causes radial expansion of the sleeve;

an elongated externally-threaded member having a multi-start thread engaged in a complementary, axially extending tapped bore in the expander member, the multi-start thread acting to limit the applied torque to avoid overtightening; and means for rotating the externally-threaded member relative to the expander member so as to move the expander member relative to the sleeve and thereby to expand the sleeve into contact with surfaces defining said hole and to anchor it therein.

* * * * *